No. 723,440. PATENTED MAR. 24, 1903.
V. F. CASEY & J. P. STENDEBACH.
AUTOMATIC FEED WATER REGULATOR.
APPLICATION FILED MAR. 27, 1902.
NO MODEL.
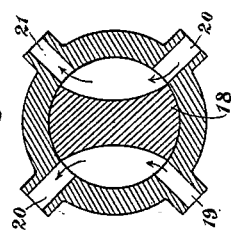
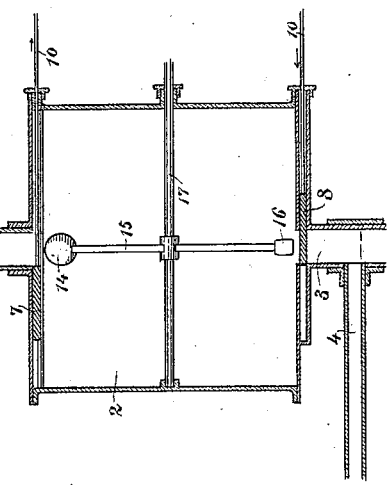
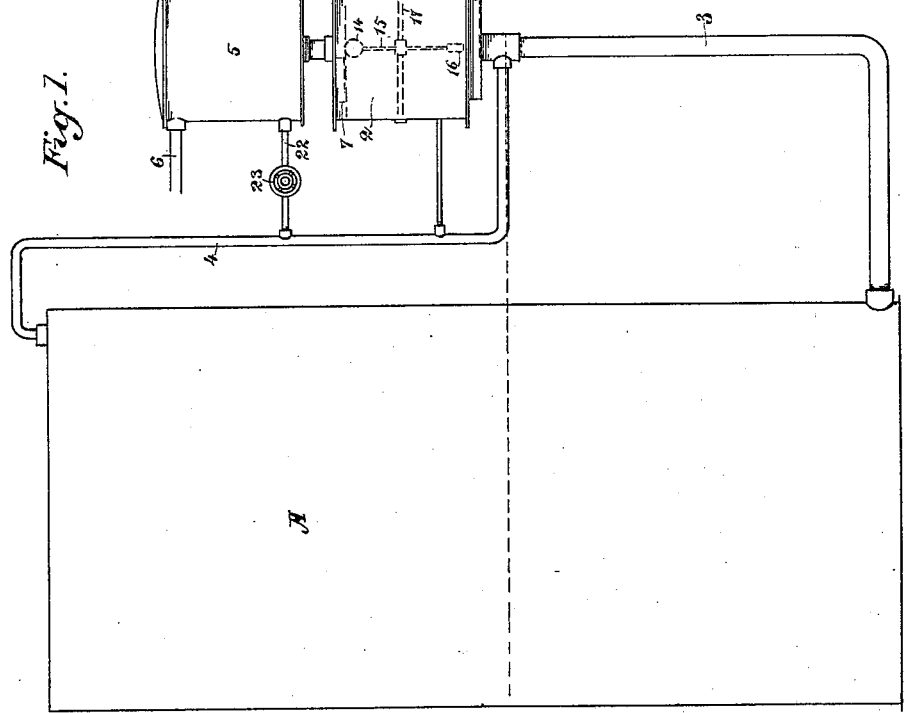

UNITED STATES PATENT OFFICE.

VASCO F. CASEY AND JOHN P. STENDEBACH, OF SAN FRANCISCO, CALIFORNIA.

AUTOMATIC FEED-WATER REGULATOR.

SPECIFICATION forming part of Letters Patent No. 723,440, dated March 24, 1903.

Application filed March 27, 1902. Serial No. 100,156. (No model.)

*To all whom it may concern:*

Be it known that we, VASCO F. CASEY and JOHN P. STENDEBACH, citizens of the United States, residing in the city and county of San Francisco, State of California, have invented an Improvement in Automatic Feed-Water Regulators; and we hereby declare the following to be a full, clear, and exact description of the same.

Our invention relates to improvements in apparatus by which the supply of water to steam-boilers is regulated automatically.

It consists of a receiving-chamber, a stand water-pipe connecting said chamber with the water-space of the boiler, a superposed supply-chamber, a pipe connecting the steam-space of the boiler and the stand-pipe below said receiving-chamber, valves controlling the admission to and discharge from said chamber, and a float-valve therein and mechanism whereby said controlling-valves are alternately opened and closed to admit water to the boiler according as the water falls in the latter below a predetermined level.

It also comprises details, which will be more fully described hereinafter, having reference to the accompanying drawings.

Figure 1 is a general view of the regulator. Fig. 2 is a detail section of the four-way cock. Fig. 3 is a similar view of the chamber containing the valves.

A represents a steam-boiler, and 2 is a chamber suitably disposed in relation to the boiler. A pipe 3 connects this chamber with the water-space of the boiler, while a pipe 4 connects the steam-space of the boiler and the pipe 3 at a point just below the receiving-chamber. The point at which this steam-pipe joins the stand water-pipe represents the desired water-level in the boiler. A chamber 5 is disposed above and is connected with the receiving-chamber, and a pipe 6 connects with a suitable source of water-supply. Admission of water to the receiving-chamber is governed by a slide-valve 7, and the discharge from said chamber into the water-pipe leading to the boiler is controlled by a similar valve 8. These valves are operated simultaneously but successively by means of a pivoted yoke 9, connecting with the valve-stems 10. The feed-valves 7 and 8, while moving, as stated, will never both be open at the same time. The stem of one or the other of the valves 7 or 8 (the former here shown) is connected with the piston 12 of a small closed cylinder 13.

The operation of the feed-valves 7 and 8 is effected by admitting a propelling medium, as steam, to one end or the other of the cylinder to move the piston. The admission and exhaust to this cylinder may be done in a variety of ways. We have here shown the following means by which water is successively admitted from the chamber 5 into the chamber 2, and thence to the boiler, according as needed. In the receiving-chamber 2 is a ball-float 14, preferably of solid aluminium, mounted on a rod 15, which carries a counterbalance-fall 16 at its other end. The difference in weight between these two balls is less than the weight of the water displaced by the ball 14. A solid ball-float is preferable to the ordinary hollow float, for the reason that the latter frequently leaks or absorbs moisture and gradually becomes ineffective. The rod 15 is secured to a shaft 17, which is suitably journaled in the walls of the chamber, so as to prevent escape of any fluid therefrom. The outer end of the shaft operates a four-way cock 18, by which steam is alternately admitted from the pipe 19 into one or the other of the pipes 20, connecting with either end of the cylinder 13 and exhausted through the port 21.

If desired, a steam-pipe 22, having a cock 23, may connect with the chamber 5. This connection is for the purpose of creating a vacuum in the chamber when it is intended to start the apparatus after steam has been gotten up in the boiler, but before any water is in either of the chambers 5 or 2. For example, in operation steam is admitted to the chamber 5 until all the air in the chamber and pipe 6 has been blown out through the water in the supply-tank, which latter is so situated that water can be siphoned into the chamber after the apparatus is once started. Assuming that the chamber 2 is also empty, the float will hang dependent, leaving the valve 8 closed and the valve 7 open. When steam is admitted to the chamber 5 through pipe 22 and the air expelled, as stated, the cock 23 is then turned, whereupon condensation takes place and the receiving-chamber 2 fills with water. This causes the float to rise, turning the cock 18 to reverse the piston in cylinder 13 and so move the valves 7 and 8, the former to close and the latter to open. As before stated, the movement of these valves is such that they are never open at the same time in such a manner as to offer direct communication between the pipe 3 and chamber 5, and so allow the steam from the boiler to blow off through the apparatus. The timing of their movement is such that the valve 7 will always be closed before 8 begins to uncover its port. The opening of valve 8 allows the water in the receiving-chamber to discharge into pipe 3, whence it flows into the boiler. The connection with the steam-space of the boiler equalizes the pressure in the stand-pipe, and as the water rises or falls in the boiler it correspondingly rises or falls in the pipe 3. As the chamber 2 is closed at the top when discharging, the water so discharged is replaced by steam from pipe 4. In case one charge from chamber 2 is not enough to supply the boiler deficiency—that is, bring the water-level up to the mouth of pipe 4—the dropping of the float causes the cock 18 again to reverse the valves. The steam in the chamber condenses immediately on coming in contact with the cold water from chamber 5, creates a vacuum, and serves to draw in water to fill the chamber 5. The reciprocation of the valves 7 and 8 and the alternate filling and emptying of the chamber 2 continue until the water in the boiler rises to a level with the mouth of the steam-pipe 4. This causes a temporary cessation of the flow of steam to the chamber 2 and water discharge from the latter into the boiler; but the moment the water-level drops the interchange recommences, and so the apparatus becomes self-operating.

Having thus described our invention, what we claim, and desire to secure by Letters Patent, is—

1. The combination in a boiler-feed regulator, of a receiving-chamber; a pipe connecting said chamber and the water-space of the boiler; a pipe connecting the steam-space of the boiler and the said water-pipe; a reciprocating-valve mechanism controlling the admission to and discharge from the chamber; and means within the chamber and dependent upon the alternate filling and emptying thereof for operating the valves.

2. The combination in a boiler-feed regulator, of a receiving-chamber, a pipe leading therefrom to the water-space of the boiler, a pipe connecting the steam-space of the boiler and said water-pipe, valves controlling the admission to and discharge from said chamber, and a float-valve by which said controlling-valves are operated.

3. The combination in a boiler-feed regulator of a receiving-chamber, connections therebetween and the water and steam spaces of the boiler, valves controlling the admission to and discharge from said chamber, a turnable float in said chamber, and steam-controlling means fixed to the axis of the float and adapted to be operated by said float to open and close said valves successively.

4. The combination in an automatic boiler-feed regulator of a chamber interposed between the boiler and a source of supply, a reciprocating-valve mechanism including valves at the inlet and discharge of the chamber, means connecting the valves, and a turnable float within the chamber and controlling said valves whereby water is successively let into and discharged from said chamber, and steam connections between said chamber and the boiler whereby steam is admitted thereto which subsequently becoming condensed creates a vacuum and causes said chamber to refill with water.

5. The combination in a boiler-feed regulator, of a receiving-chamber, steam and water connections of said chamber and the boiler, a superposed chamber, connections between said chambers, a valve in said connections, steam connections with said superposed chamber whereby a vacuum may be created in order to prime said chamber, a valve controlling the discharge from the receiving-chamber into the boiler and means for operating said valves so that their ports are successively opened or closed.

6. The combination in a boiler-feed regulator of a receiving-chamber, a pipe connecting said chamber with the water-space of the boiler, a steam-pipe connecting said water-pipe and the steam-space of the boiler, a chamber superposed above said receiving-chamber, a valve interposed between said chambers, a valve controlling the flow of water from said receiving-chamber, and means by which said valves are moved simultaneously and their ports successively opened or closed to admit water as needed to the boiler.

7. The combination in a boiler-feed regulator of a receiving-chamber, steam and water connections of said chamber and the boiler, slide-valves controlling the admission to and discharge from said chamber, a cylinder disposed in relation to one of said valves, a plunger reciprocable therein, a turnable float in said chamber and means by which said float governs the admission and exhaust of a propelling medium to and from said cylinder.

8. The combination in a boiler-feed regulator of a chamber interposed between the boiler and a source of water-supply, a pipe connecting said chamber and the water-space of the boiler, a steam-pipe entering said water-pipe, valves controlling the admission and discharge from said chamber, a float in said chamber, a shaft to which said float is secured, a valve exterior to the chamber, connections between said valve and the boiler, a cylinder, connections between said cylinder and said last-named valve, a piston reciprocable in said cylinder, connections between said piston and said controlling-valves whereby the latter are simultaneously moved and their ports successively opened or closed as the float rises and falls.

9. In an automatic boiler-feed regulator, the combination with a chamber interposed between the boiler and a source of water-supply and valves governing the admission to and discharge from said chamber, of a rotatable shaft in the latter, connections between said shaft and said valves whereby the latter are reciprocated in relation to the rise and fall of water in the chamber, a float connected with said shaft and comprising a rod to either end of which is secured a solid metal body, said bodies of different weights, and the difference in said weights being less than the weight of the water displaced by the heavier of said bodies.

In witness whereof we have hereunto set our hands.

VASCO F. CASEY.
JOHN P. STENDEBACH.

Witnesses:
S. H. NOURSE,
JESSIE C. BRODIE.